US011035455B2

(12) United States Patent
Nikprelevic et al.

(10) Patent No.: US 11,035,455 B2
(45) Date of Patent: Jun. 15, 2021

(54) GASKET WITH INTEGRATED SEALED PASS THROUGH

(71) Applicants:Mark Nikprelevic, Rochester Hills, MI (US); Derrick S Reiss, Shelby Township, MI (US); Tejinder Singh, Dexter, MI (US); Mark C Graebner, Lake Orion, MI (US); Richard Scorzelli, Fowlerville, MI (US); Namrood Al-Mooshi, Farmington Hills, MI (US)

(72) Inventors: Mark Nikprelevic, Rochester Hills, MI (US); Derrick S Reiss, Shelby Township, MI (US); Tejinder Singh, Dexter, MI (US); Mark C Graebner, Lake Orion, MI (US); Richard Scorzelli, Fowlerville, MI (US); Namrood Al-Mooshi, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 486 days.

(21) Appl. No.: 16/017,330

(22) Filed: Jun. 25, 2018

(65) Prior Publication Data
US 2019/0390759 A1    Dec. 26, 2019

(51) Int. Cl.
| F16H 57/02 | (2012.01) |
| F01M 11/00 | (2006.01) |
| F16H 57/03 | (2012.01) |
| F16H 57/029 | (2012.01) |
| F16J 15/02 | (2006.01) |
| F16J 15/10 | (2006.01) |
| F16H 57/031 | (2012.01) |

(52) U.S. Cl.
CPC ....... *F16H 57/029* (2013.01); *F01M 11/0004* (2013.01); *F16H 57/031* (2013.01); *F16J 15/022* (2013.01); *F16J 15/102* (2013.01); *F01M 2011/0058* (2013.01); *F01M 2011/0062* (2013.01)

(58) Field of Classification Search
CPC ..... F16H 57/029; F16H 57/031; F16J 15/022; F16J 15/102; F16J 15/062; F01M 11/0004; F01M 2011/0062; F01M 2011/0058
See application file for complete search history.

(56) References Cited

U.S. PATENT DOCUMENTS

| 4,997,193 A | 3/1991 | Czernik |
| 5,364,109 A | 11/1994 | Sihon |
| 5,428,895 A | 7/1995 | Sihon |

(Continued)

*Primary Examiner* — Luis A Gonzalez
(74) *Attorney, Agent, or Firm* — Ralph E Smith

(57) ABSTRACT

A gasket assembly for sealing between a first component and a second component, the first component having a main cavity separated from a secondary cavity by at least one wall, the at least one wall having an aperture formed therethrough, includes a device configured to extend through the aperture. An aperture sealing insert is molded around a portion of the device, the aperture sealing insert sized and shaped to fit into the aperture. An aperture seal is disposed about an outer perimeter surface of the aperture sealing insert, the aperture seal configured to seal against surfaces defining the aperture. A gasket baseplate is configured to be disposed over the aperture sealing insert between the first component and the second component to fluidly seal the main cavity from the secondary cavity while enabling the device to pass through the aperture.

11 Claims, 6 Drawing Sheets

(56) References Cited

U.S. PATENT DOCUMENTS

| | | |
|---|---|---|
| 5,536,023 A | 7/1996 | Surbrook et al. |
| 5,618,047 A | 4/1997 | Belter |
| 7,938,095 B2 | 5/2011 | Jessberger et al. |
| 2006/0131141 A1 | 6/2006 | Hinson et al. |
| 2011/0163508 A1 | 7/2011 | Nishimura et al. |
| 2014/0138917 A1 | 5/2014 | Sieff |

GASKET WITH INTEGRATED SEALED PASS THROUGH

The present application relates generally to gaskets and, more particularly, to a transmission oil pan gasket with an integrated pass through for electrical components.

BACKGROUND

Conventional vehicle transmissions include a housing and an oil pan cover fastened together by bolts. A gasket is arranged between the housing and the oil pan to fluidly seal the transmission and prevent escape of automatic transmission fluid (ATF). The inventors discovered it would be desirable to package electrical components inside the transmission, which must be sealed in a dry enclosure separated from the ATF. To do so, openings in the enclosure are required for electrical connections, which may potentially subject the dry enclosure to leaks. Accordingly, it is desirable to provide a seal to enable the electrical connections to pass into the dry enclosure without allowing ATF therein.

SUMMARY

In accordance with one example aspect of the invention, a gasket assembly for sealing between a first component and a second component is provided, the first component having a main cavity separated from a secondary cavity by at least one wall, the at least one wall having an aperture formed therethrough. In one example implementation, the gasket assembly includes a device configured to extend through the aperture, an aperture sealing insert molded around a portion of the device, the aperture sealing insert sized and shaped to fit into the aperture, an aperture seal disposed about an outer perimeter surface of the aperture sealing insert, the aperture seal configured to seal against surfaces defining the aperture, and a gasket baseplate configured to be disposed over the aperture sealing insert between the first component and the second component to fluidly seal the main cavity from the secondary cavity while enabling the device to pass through the aperture.

In addition to the foregoing, the described gasket assembly may include one or more of the following: wherein the aperture sealing insert includes a channel formed in the outer perimeter surface, and wherein the aperture seal is disposed within the channel; a second channel formed in a bottom surface of the gasket baseplate, wherein at least a portion of the aperture seal is disposed within the second channel; a third channel formed in a top surface of the gasket baseplate opposite the bottom surface, wherein an outer seal is disposed within the third channel; wherein the gasket baseplate extends substantially along a first plane and the aperture sealing insert extends substantially along a second plane different than the first plane; and wherein the first plane is orthogonal to the second plane.

In accordance with another example aspect of the invention, an apparatus is provided. In one example implementation, the apparatus includes a first housing having an outer wall and an inner wall defining a main cavity and a secondary cavity separated by the inner wall, a second housing configured to couple to the first housing to enclose the main cavity and the secondary cavity, an aperture formed in the inner wall and fluidly connecting the main cavity and the secondary cavity, and a device disposed in the secondary cavity, wherein a portion of the device extends through the aperture into the main cavity. A gasket assembly includes an aperture sealing insert molded around the portion of the device extending through the aperture, the aperture sealing insert disposed within the aperture, an aperture seal disposed about an outer perimeter surface of the aperture sealing insert, the aperture seal sealed against walls defining the aperture, and a gasket baseplate disposed over the aperture sealing insert between the first housing and the second housing to fluidly seal the main cavity from the secondary cavity while enabling the portion of the device to pass through the aperture.

In addition to the foregoing, the described apparatus may include one or more of the following: wherein the first housing is a main housing of a transmission, and the second housing is an oil pan of the transmission; wherein the device is a power inverter module; wherein the portion of the device extending through the aperture is a busbar; wherein the aperture sealing insert includes a channel formed in the outer perimeter surface, and wherein the aperture seal is disposed within the channel; a second channel formed in a bottom surface of the gasket baseplate, wherein at least a portion of the aperture seal is disposed within the second channel; a third channel formed in a top surface of the gasket baseplate opposite the bottom surface, wherein an outer seal is disposed within the third channel; wherein the gasket baseplate extends substantially along a first plane and the aperture sealing insert extends substantially along a second plane different than the first plane; and wherein the outer seal, gasket baseplate, and aperture seal are overmolded together as an integral piece.

In accordance with another example aspect of the invention, a method of assembling an apparatus is provided. In one example, the method includes providing a first housing having an outer wall and an inner wall defining a main cavity and a secondary cavity separated by the inner wall, wherein an aperture is formed in the inner wall fluidly connecting the main cavity and the secondary cavity, providing a second housing configured to couple to the first housing to at least partially enclose the main cavity and the secondary cavity, and providing a device, wherein a portion of the device is configured to extend through the aperture into the main cavity. The method further includes molding an aperture sealing insert around the portion of the device configured to extend through the aperture, disposing an aperture seal about an outer perimeter surface of the aperture sealing insert, and inserting the device into the secondary cavity such that the aperture sealing insert is inserted into the aperture and the aperture seal is sealed against walls defining the aperture. The method further includes disposing a gasket baseplate on the first housing over the aperture sealing insert to fluidly seal the main cavity from the secondary cavity while the portion of the device extends through the aperture, disposing the second housing over the gasket baseplate opposite the first housing, and coupling the second housing to the first housing.

In addition to the foregoing, the described method may include one or more of the following: forming the gasket baseplate (40), the aperture seal (62), and an outer seal (58) as an integral piece.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

Figure 1:
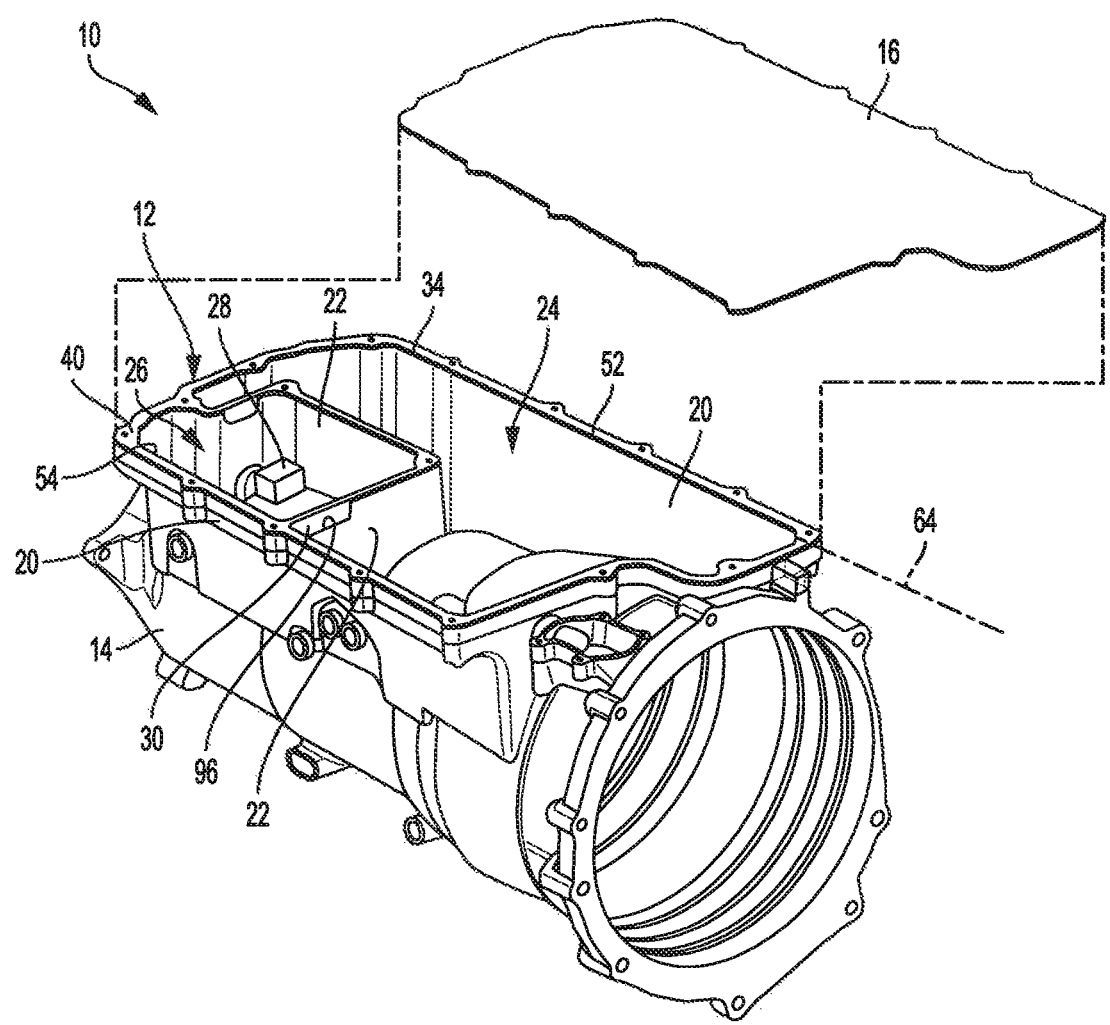
FIG. 1 is a perspective view of an example transmission and gasket assembly in accordance with the principles of the present application.

With initial reference to FIG. 1, an example transmission is illustrated and generally identified at reference numeral 10. The transmission generally includes a gasket assembly 12 disposed between a main housing 14 and an oil pan cover or secondary housing 16 to provide a fluid seal therebetween. However, it will be appreciated that gasket assembly 12 is not limited to use with transmission 10 and may be utilized in various other sealing applications such as, for example, between a cover and cylinder head of an internal combustion engine.

As illustrated, main housing 14 includes an outer wall 20 and an inner wall 22. In this way, outer wall 20 and inner wall 22 define a main enclosure or cavity 24 and a secondary enclosure or cavity 26.

The main cavity 24 houses main components of the transmission 10 (e.g., gears, shafts, etc.) as is well known in the art. With the oil pan cover 16 assembled to main housing 14, the main cavity 24 further houses a lubricant such as oil or automatic transmission fluid (ATF) to provide lubrication to the various internal components of transmission 10.

Figure 4:
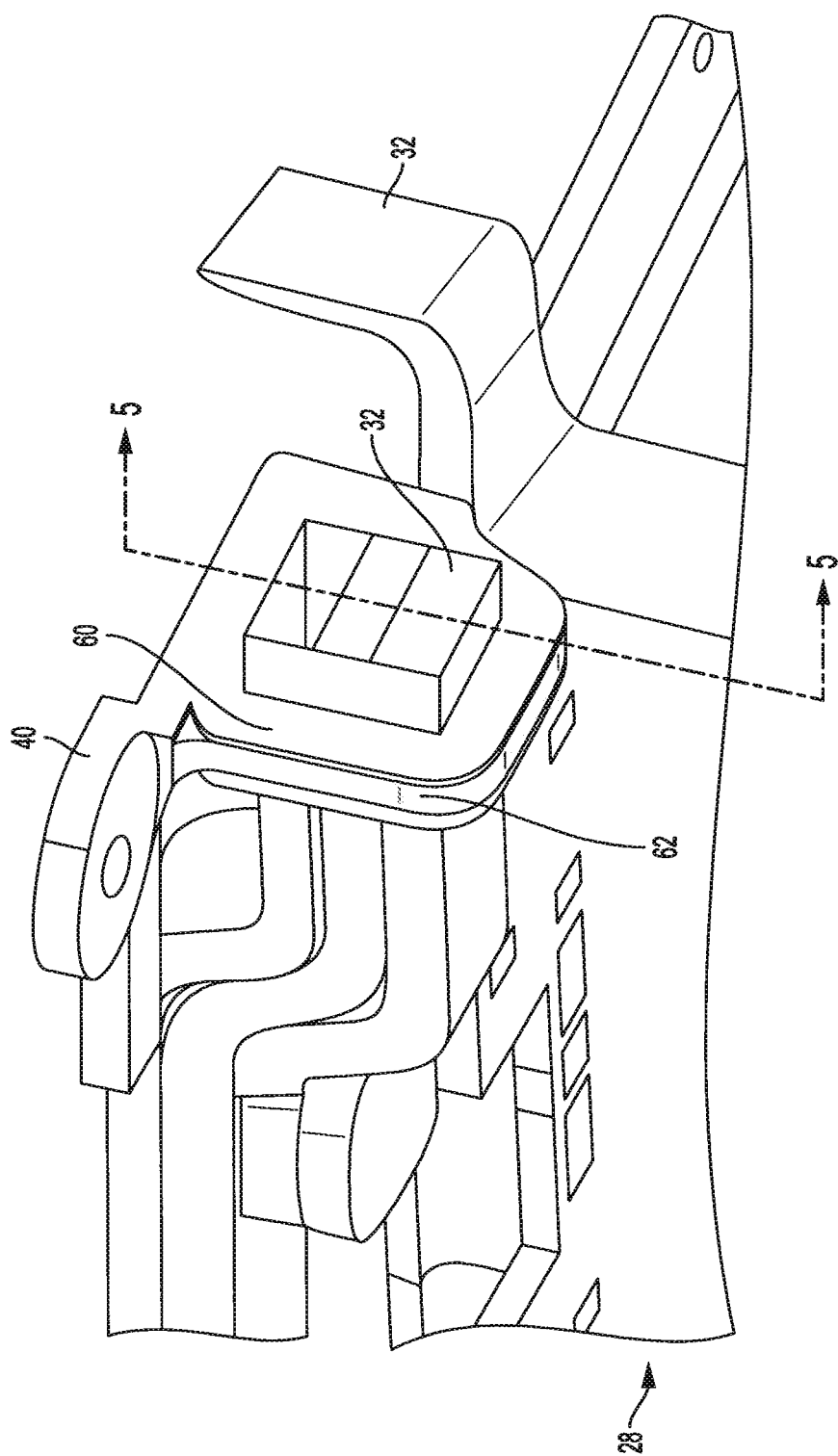
FIG. 4 is a sectional perspective view of a portion of the gasket assembly shown in FIG. 1 assembled to an example electrical connector, in accordance with the principles of the present application.
Figure 5:
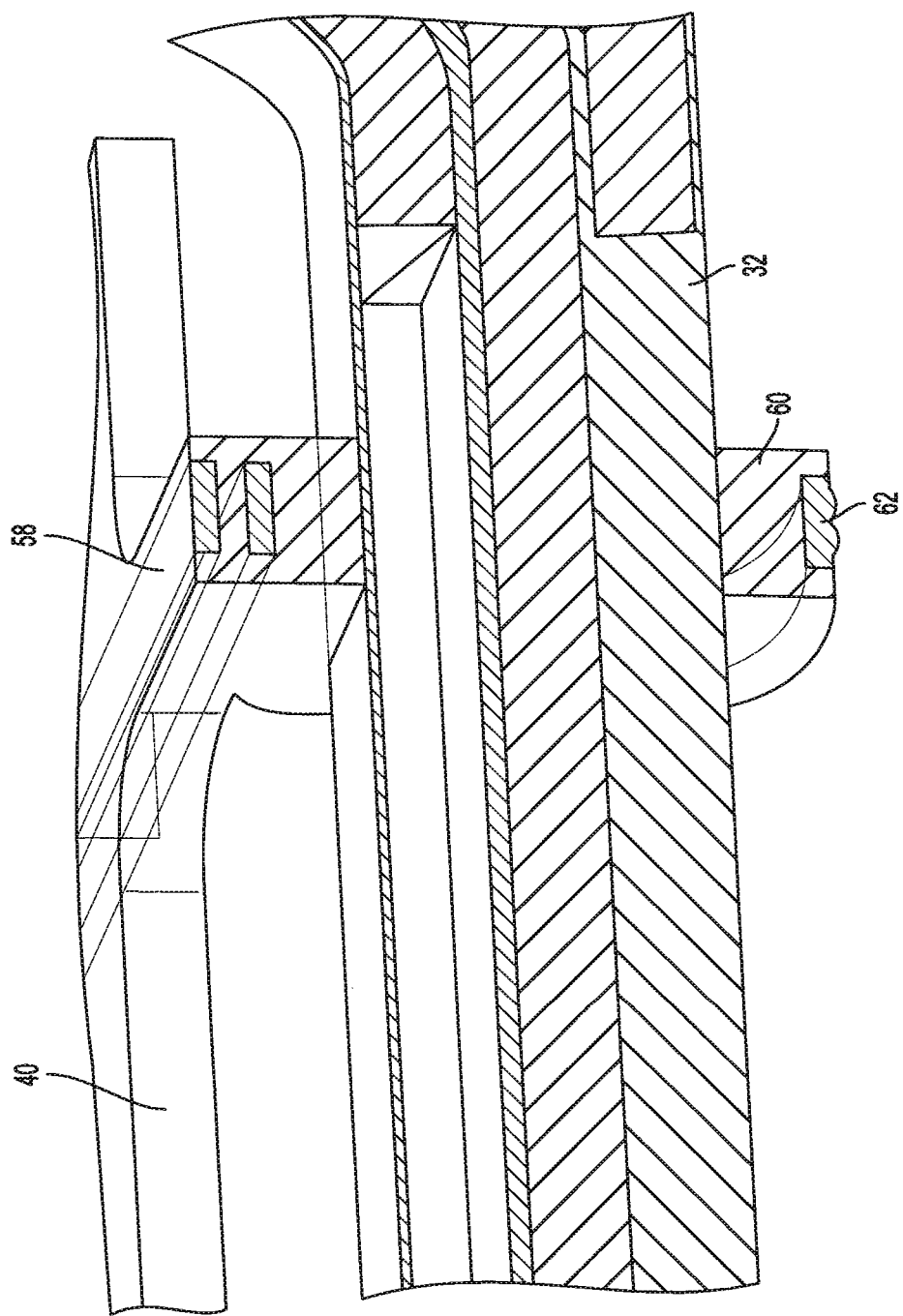
FIG. 5 is a sectional perspective view of the gasket assembly shown in FIG. 4 and taken along the line 5-5, in accordance with the principles of the present application.
Figure 6:
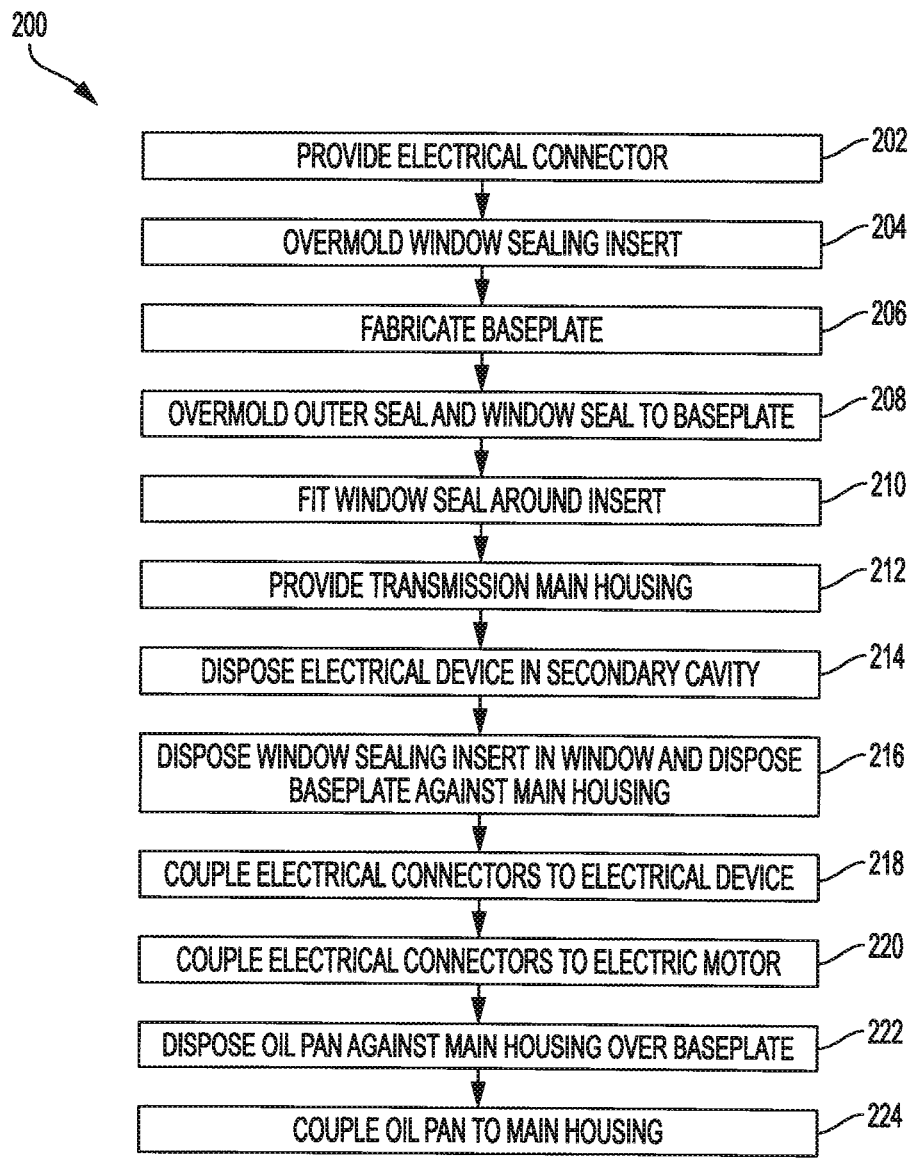
FIG. 6 is a flow chart illustrating an example method of assembling the transmission shown in FIG. 1, in accordance with the principles of the present application.

The secondary cavity 26 is configured to house an electrical device 28 such as, for example, a power inverter module. In the illustrated example, secondary cavity 26 provides a dry environment or enclosure for secondary cavity 26 that is fluidly separated from the main cavity 24 and the ATF stored therein. In the example embodiment, inner wall 22 includes one or more apertures or windows 30 formed therein to enable electrical connectors 32 (e.g., busbars, see FIG. 4) to extend into the dry secondary enclosure 26 for coupling with the electrical device 28.

As described herein in more detail, gasket assembly 12 is provided to fluidly seal the dry secondary cavity 26 from the main cavity 24 and facilitate preventing fluids from passing therebetween. More particularly, gasket assembly 12 is configured to not only provide sealing along an upper edge 34 of the outer and inner walls 20, 22, but also provide sealing of windows 30 to enable electrical connectors 32 to pass therethrough.

Figure 2:
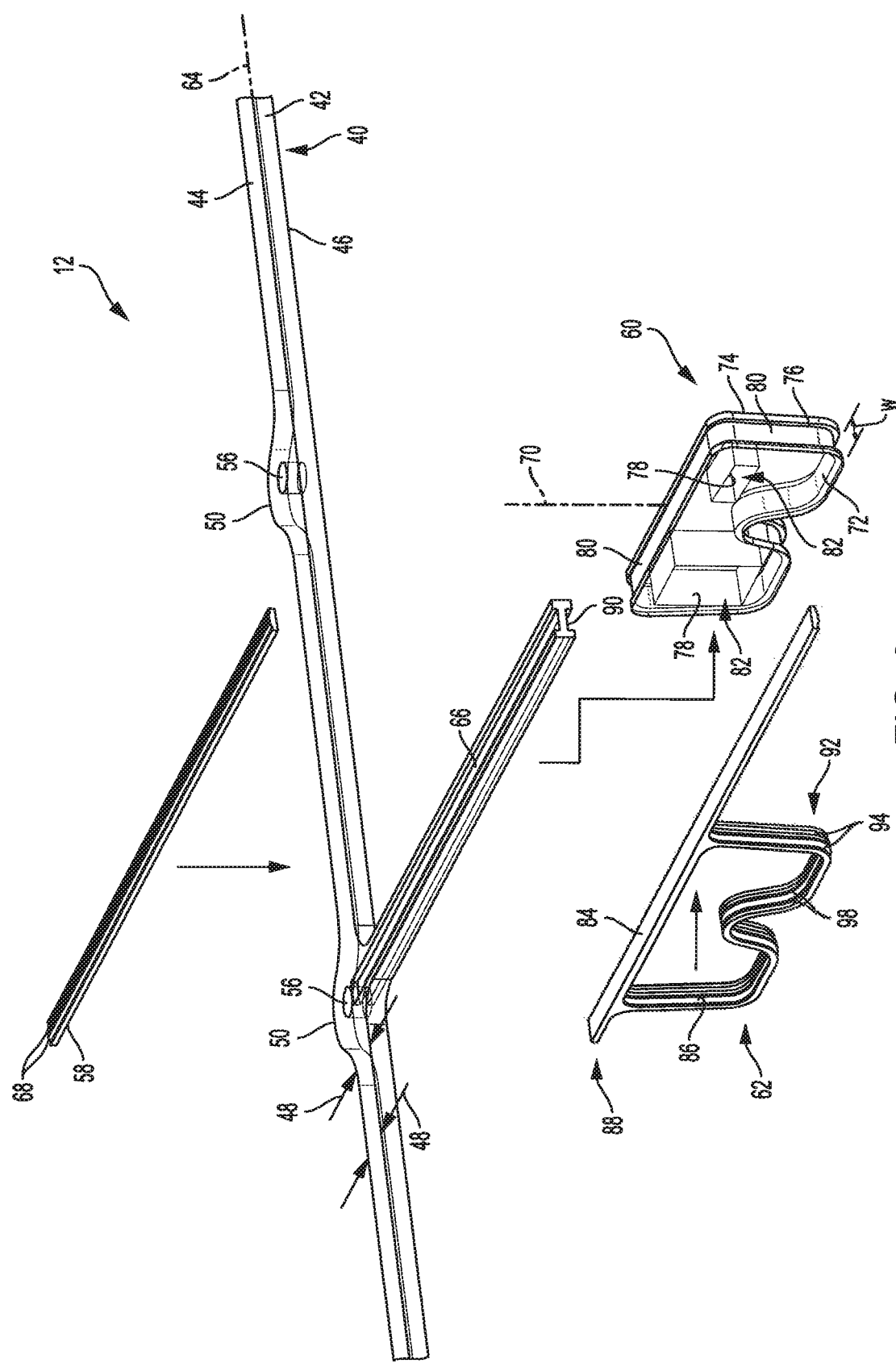
FIG. 2 is an exploded view of a portion of the example gasket assembly shown in FIG. 1 in accordance with the principles of the present application.

With reference to FIGS. 1 and 2, in the example embodiment, gasket assembly 12 generally includes a backbone or baseplate 40, a case seal or outer seal 58, a window sealing puck or insert 60, and a window gasket or seal 62.

In one example embodiment, baseplate 40 is blanked from a sheet of steel, or other suitable material, of a predetermined thickness range. In alternative embodiments, baseplate 40 can be fabricated from an injection molded plastic. The baseplate 40 has a generally rectangular and flattened main body 42 with a top side 44, a bottom side 46, a range of widths 48, and rounded corners 50. The baseplate 40 defines a main inner opening 52 and a secondary inner opening 54 (see FIG. 1).

When baseplate 40 is disposed between the transmission main housing 14 and the oil pan 16, the main inner opening 52 corresponds to the opening of the main cavity 24, and the secondary inner opening 54 corresponds to the secondary cavity 26. However, it will be appreciated that baseplate 40 may have various shapes or arrangements that enable it to seal other variously shaped components.

In the illustrated example, insert bottom side 46 is configured to be disposed against the upper edge 34 of the outer and inner walls 20, 22. Similarly, the baseplate top side 44 is configured to be disposed against an outer edge of walls (not shown) of the oil pan cover 16 that correspond to the outer and inner walls 20, 22 to facilitate defining main cavity 24 and secondary cavity 26. In this way, baseplate 40 is configured to be disposed between and interface with the oil pan 16 and the transmission main housing 14.

Furthermore, in the example embodiment, insert main body 42 includes a plurality of fastener apertures 56 configured to receive fasteners (not shown) for coupling the oil pan 16 to the main housing 14. Additionally, in some examples, one or more seals 58 (e.g., rubber compound, thermoplastic material, etc.) are molded to main body 42 to provide improved sealing between the oil pan 16 and main housing 14. In still other examples, baseplate 40 may be completely encased with the material of seal 58. As such, when arranged on main housing 14, baseplate 40 extends along a horizontal plane 64 and is configured to provide an interface between the main housing 14 and the oil pan 16 to fluidly seal therebetween.

With further reference to FIGS. 2-5, in the example embodiment, outer seal 58 is disposed in a channel 66 formed in the baseplate top side 44. The seal 58 is configured to be disposed against the oil pan 16 to create a fluid seal therewith. In the illustrated example, outer seal 58 includes a pair of sealing lips 68. However, it will be appreciated that outer seal 58 may have any number of sealing lips 68 that enable gasket assembly 12 to function as described herein.

Figure 3:
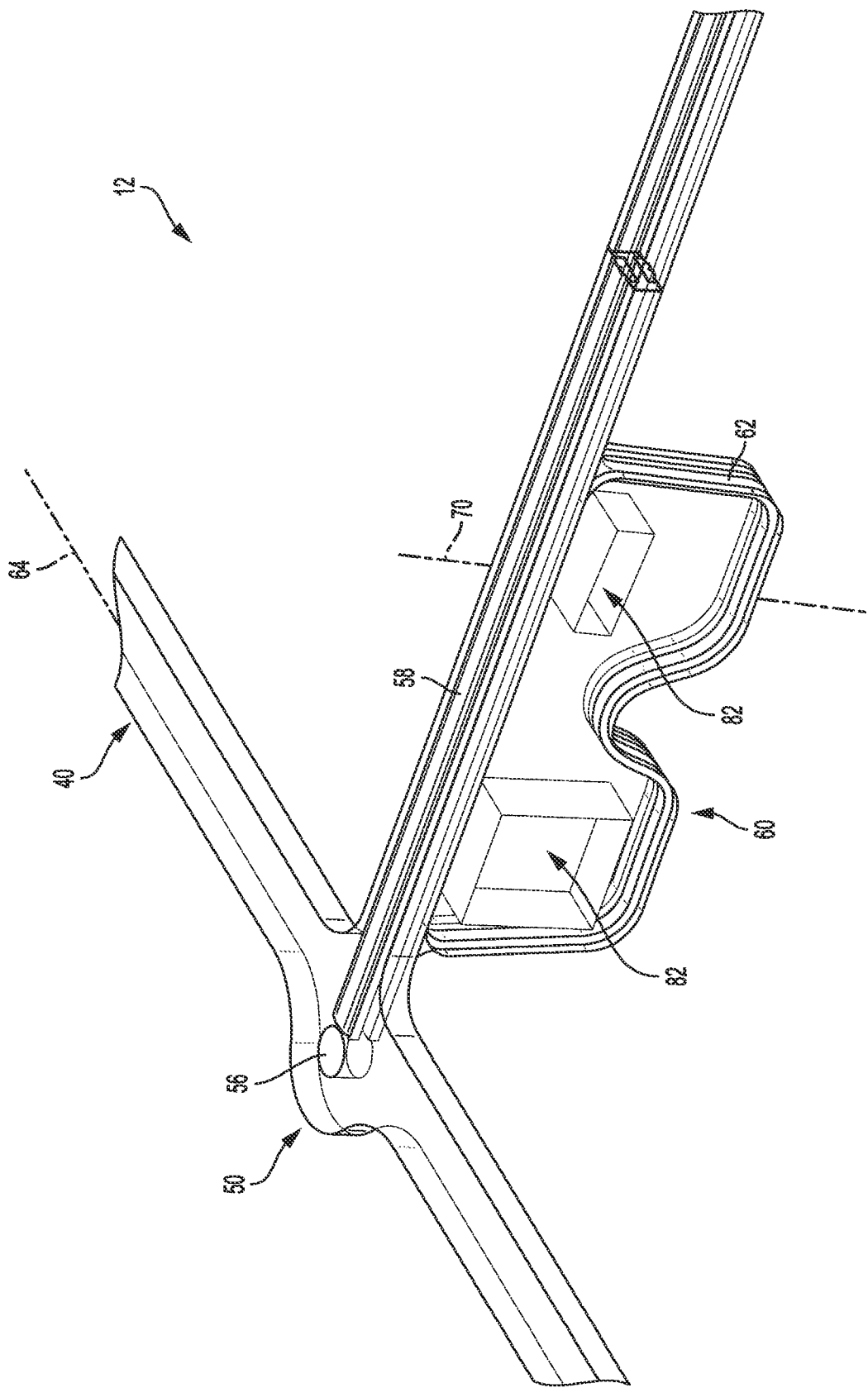
FIG. 3 is a perspective view of the gasket assembly shown in FIG. 2 after assembly, in accordance with the principles of the present application.

In the example embodiment, window sealing insert 60 is coupled to baseplate 40 and extends generally outward from the baseplate bottom side 46 along a vertical plane 70 (see FIG. 3). In the example embodiment, plane 70 extends perpendicular to or substantially perpendicular to horizontal plane 64, and window sealing insert 60 is generally shaped to fit within windows 30. However, window sealing insert 60 may have any shape and/or be coupled to baseplate 40 in any suitable orientation to seal a specifically shaped window 30.

In the illustrated example, window sealing insert 60 is generally rectangular and includes a front face 72, an opposite rear face 74, an outer perimeter surface 76, and inner walls 78. In some examples, front face 72 and rear face 74 are spaced apart a width 'W' that is equal to or substantially equal to a thickness of inner wall 22. A channel 80 is formed in the outer perimeter surface 76 and configured to receive the window seal 62 therein.

In the illustrated embodiment, channel 80 extends about the entire outer perimeter surface 76 such that window seal 62 completely surrounds the window sealing insert 60. However, in alternative embodiments, channel 80 can extend around only a portion of the outer perimeter surface 76. Inner walls 78 define electrical connector receiving apertures 82 configured to sealingly receive electrical connectors 32 (see FIGS. 3 and 4). In the illustrated example, apertures 82 are generally rectangular. However, it will be appreciated that electrical connector receiving apertures 82 may have any suitable shape to fit around a particularly shaped electrical connector 32.

With continued reference to FIG. 2, in the example embodiment, window seal 62 generally includes an outer surface 84 and an inner surface 86. An upper portion 88 of outer surface 84 is generally flat and is disposed within a channel 90 formed in the baseplate bottom side 46. A lower portion 92 of outer surface 84 includes one or more sealing lips 94 (two shown) configured to be seated against walls 96 forming the window 30. The inner surface 86 similarly includes one or more sealing lips 98 (two shown) configured to seal against outer perimeter surface 76 within channel 80. In the example embodiment, outer seal 58, baseplate 40, and window seal 62 are overmolded at the same time to form an integral piece.

In one example, a method 200 of assembling transmission 10 begins by providing electrical connector 32 (e.g., one or more bus bars) at step 202. At step 204, window sealing insert 60 is overmolded around the electrical connectors 32 to provide uniform sealing therearound. At step 206, baseplate 40 is fabricated from a suitable material (e.g., blanked from steel sheet or injection molded).

At step 208, outer seal 58 and window seal 62 are overmolded to baseplate 40 on top side 44, bottom side 46, and/or a channel formed in either side 44, 46 (e.g., channel 66). At step 210, window seal 62 is stretched and fitted around the window sealing insert 60 such that the window seal 62 is disposed within channel 80

At step 212, transmission main housing 14 is provided. At step 214, the electrical device is disposed and/or secured within the secondary cavity 26. At step 216, the window sealing insert 60 is disposed within window 30 along with electrical connectors 32, and the bottom side 46 of baseplate 40 is disposed against the upper edge 34 of the outer and inner walls 20, 22 such that upper portion 88 of window seal 62 is received within channel 90, and outer seal 58 (if included) is sealed against upper edge 34. At step 218, the electrical connectors 32 are electrically coupled to electrical device 28.

At step 220, the electrical connectors 32 are electrically coupled to another electrical device (not shown) such as, for example, an electric motor. At step 222, the oil pan 16 is disposed against the baseplate 40 top side 44 such that outer seal 58 (if included) is sealed thereagainst. Finally, at step 224, the oil pan 16 is coupled to the main housing 14, for example, via a plurality of fasteners (not shown).

Described herein are systems and methods for sealing joints (e.g., T-joints). A gasket assembly includes a baseplate and an aperture sealing insert configured to be inserted into an aperture such as a window formed in a transmission housing wall to receive electrical connectors therethrough. The aperture sealing insert is overmolded around the electrical connectors and an aperture seal is disposed about the sealing insert. The sealing insert and seal are subsequently disposed in the aperture to provide a fluid tight seal for the window. A gasket is then disposed over the aperture sealing insert and is configured to seal between two components such as, for example, a transmission main housing and oil pan. In this way, the aperture sealing insert and aperture seal fluidly seal an enclosure of the transmission while allowing electrical connectors to pass into the sealed enclosure.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A transmission comprising:
a transmission housing having an outer wall and an inner wall defining a main cavity and a secondary cavity separated by the inner wall, the main cavity exposed to lubricant and the secondary cavity being a dry cavity;
a cover configured to couple to the transmission housing to enclose the main cavity and the secondary cavity;
an aperture formed in the inner wall and connecting the main cavity and the secondary cavity;
a device disposed in the secondary cavity, wherein a portion of the device extends through the aperture into the main cavity; and
a gasket assembly for sealing the secondary cavity from the main cavity, including:
an aperture sealing insert disposed within the aperture and sealingly positioned around the portion of the device extending through the aperture;
an aperture seal disposed about an outer perimeter surface of the aperture sealing insert and sealing against walls defining the aperture; and
a gasket baseplate disposed over the aperture sealing insert between the transmission housing and the cover and receiving a portion of the aperture seal therein to fluidly seal the cover to the housing and the main cavity from the secondary cavity while enabling the portion of the device to pass through the aperture.

2. The transmission of claim 1, wherein the aperture sealing insert includes a channel formed in the outer perimeter surface, and wherein the aperture seal is disposed within the channel.

3. The transmission of claim 2, further comprising a second channel formed in a bottom surface of the gasket baseplate, and wherein at least a portion of the aperture seal is disposed within the second channel.

4. The transmission of claim 3, further comprising a third channel formed in a top surface of the gasket baseplate opposite the bottom surface, and wherein an outer seal is disposed within the third channel.

5. The transmission of claim 4, wherein the outer seal, gasket baseplate, and aperture seal are overmolded together as an integral gasket.

6. The transmission of claim 5, wherein the overmolded outer seal and aperture seal couple together the aperture sealing insert and the gasket baseplate.

7. The transmission of claim 4, wherein the gasket baseplate extends substantially along a first plane and the aperture sealing insert extends substantially along a second plane different than the first plane.

8. The transmission of claim 7, wherein the second plane is orthogonal to the first plane.

9. The transmission of claim 1, wherein the cover is an oil pan cover of the transmission.

10. The transmission of claim 9, wherein the device is a power inverter module.

11. The transmission of claim 10, wherein the portion of the device extending through the aperture is a bus bar.

* * * * *